United States Patent
Mutz et al.

[11] Patent Number: 5,867,044
[45] Date of Patent: Feb. 2, 1999

[54] CIRCUIT ARRANGEMENT FOR SIGNAL-PAUSE DETECTION

[75] Inventors: Erhard Mutz, Waldsolms; Karl-Heinz Knobl, Limburg, both of Germany

[73] Assignee: U.S. Philips Corporation, New York, N.Y.

[21] Appl. No.: 847,437

[22] Filed: Apr. 28, 1997

[30] Foreign Application Priority Data

May 3, 1996 [DE] Germany ............... 196 17 651.4

[51] Int. Cl.⁶ .......................... H03K 5/153; H03K 3/017
[52] U.S. Cl. .................... 327/77; 327/80; 327/81; 327/87; 327/61
[58] Field of Search ................ 327/77, 81, 80, 327/60, 61, 184, 87, 88, 89

[56] References Cited

U.S. PATENT DOCUMENTS

| | | | |
|---|---|---|---|
| 3,727,143 | 4/1973 | Garrett | 328/150 |
| 4,138,615 | 2/1979 | McKinlay | 307/293 |
| 4,245,167 | 1/1981 | Stein | 307/265 |
| 4,495,428 | 1/1985 | Ishigaki | 307/490 |
| 4,499,426 | 2/1985 | Parker | 329/50 |
| 5,099,146 | 3/1992 | Miki et al. | 307/350 |
| 5,120,995 | 6/1992 | Abdi | 307/351 |

FOREIGN PATENT DOCUMENTS

0510876A2  10/1992  European Pat. Off. .

OTHER PUBLICATIONS

Data Sheet—TEA0675, Dual Dolby B–Type Noise Reduction Circuit for Playback Applications, Philips Semiconductors, Oct. 1992.

Manfred Riedel, "Suchen Und Finden", Funkschau 1977, Heft 24, Bd. 49, Nr. 24, Nov. 1977, Munchen, 1121–1123.

Anonymous: IBM Techinical Disclosure Bulletin, Bd. 20, Nr. 12, May 1978, New York, US. 5437–5440, "Amplitude Detection Method for Producing Rate Controlled Speech".

*Primary Examiner*—Timothy P. Callahan
*Assistant Examiner*—An T. Luu
*Attorney, Agent, or Firm*—Steven S. Rubin

[57] ABSTRACT

A circuit arrangement is disclosed which detects a signal pauses in an audio signal, The audio signal is amplified, rectified, and then sent to a control unit. The control unit periodically sets the output of the rectifier to a predetermined level below a threshold level. The control unit then waits a predetermined period of time and determines whether the signal at the output of the rectifier has exceeded the threshold. If is does not, a signal pause has occurred.

20 Claims, 2 Drawing Sheets ns of which the threshold value, the interval length and the period of time can be preset.

CIRCUIT ARRANGEMENT FOR SIGNAL-PAUSE DETECTION

BACKGROUND OF THE INVENTION

1. Field of the Invention

The invention relates to a circuit arrangement for the detection of signal pauses in an audio signal, comprising a rectifier element, to whose input side the audio signal is applied, and an integrator element, to which the output signal of the rectifier element is applied.

2. Description of Related Art

Such a circuit arrangement is know from Philips IC TEA 0675. This known circuit arrangement is used for the detection of signal pauses on the magnetic tape of a magnetic-tape cassette in the fast winding mode. In this known circuit arrangement the audio signal is first rectified by means of a rectifier element, is subsequently integrated by means of an integrator element, and is applied to a first comparator, which is followed by a further integrator element with a second comparator. The integrator elements are formed by means of capacitors and resistors. A pause is detected when the input signal of the first comparator remains below the threshold value of the first comparator for a time interval which is essentially defined by the time constant of the second integrator element.

The minimum detectable pause length of such a circuit arrangement is determined by the time constant of the second integrator element and cannot be changed afterwards.

SUMMARY OF THE INVENTION

It is an object of the invention to provide a user-friendly and versatile circuit arrangement of the type defined in the opening paragraph.

According to the invention this object is achieved in that there has been provided a control unit, which compares the output signal of the integrator element with a predetermined threshold value, the control unit controls switching means in intervals of predetermined interval length, which switching means sets the output signal of the integrator element to a predetermined signal reference value, and, the control unit detects signal pauses in dependence upon whether the output signal of the integrator element has been smaller than or greater than the threshold value for a predetermined period of time.

If the audio signal applied to the circuit arrangement during a time interval does not exhibit any pauses, the rectified and integrated output signal of the integrator element exceeds the threshold during the interval and the control unit detects that no pause has occurred. At the end of the interval the output signal of the integrator element is set to a predetermined signal reference value, i.e. to ground potential, and the audio signal is again rectified and integrated by means of the rectifier element and the integrator element. In an audio signal without any pauses the output signal of the integrator element again exceeds the threshold value in the course of the next interval, as a result of which the control unit detects that no pause has occurred and at the end of the interval the output signal of the integrator element is again set to the signal reference value. However, when a pause occurs in the audio signal, the rectified and integrated output signal of the integrator element does not increase during this interval and, consequently, does not exceed the threshold value, thereby signalling to the control unit that the audio signal can exhibit a pause. At the end of the interval the output signal of the integrator element is again set to the signal reference value, but owing to the pause in the audio signal the output signal of the integrator element essentially has not change relative to the signal reference value during this interval. At most, a slight increase of the output signal of the integrator element relative to the signal reference value may have occurred, for example owing to a noise signal. For a reliable pause detection it is advantageous to evaluate a plurality of consecutive intervals. If the output signal of the integrator element neither reaches the threshold value in a given number of subsequent time intervals, the control unit will interpret this as a signal pause and can start appropriate control functions. The necessary number of intervals for pause detection, in which the output signal of the integrator element does not exceed the threshold value, is determined by a period of time which can be preset in the control unit. This period of time depends on the desired minimum pause length to be detected.

As a result of the defined setting of the output signal of the integrator element to a predetermined signal reference value in intervals of predetermined interval length it is also possible to detect very short pauses. The minimum pause length to be detected is adjustable by means of the predetermined interval length and by means of the predetermined period of time.

By means of the present circuit arrangement the dynamic characteristics of an audio signal can be detected and displayed, for example, in that the output signal of the integrator element is used for driving a bar display.

A further advantageous embodiment of the invention is characterized in that the control unit sets the threshold value, the interval length and/or the period of time in dependence upon the output signal of the integrator element.

Generally, the noise level of the output signal of the integrator element increases as the amplitude of this signal increases. By means of the control unit it is possible adapt the threshold value in dependence on the amplitude, i.e. as a rule the threshold value is increased when the amplitude increases. This makes it possible to guarantee a reliable pause detection, even in signals of small amplitude.

Particularly during fast winding the tape speed in magnetic-tape cassettes in a magnetic-tape-cassette apparatus is not constant between the beginning of the tape and the end of the tape but varies owing to the changing winding diameters on the reel hubs. As the magnetic heads of magnetic-tape-cassette apparatuses essentially form an inductance, the amplitude of the induced voltage increases as the tape speed increases and consequently changes in the case of speed variations of the magnetic tape. These amplitude variations owing to the varying tape speed can be compensated for by corresponding adaptations of the threshold value, so that they do not affect the pause detection. Likewise, the minimum detectable pause length can be made independent of tape speed fluctuations by appropriate changes of the interval length or the period of time.

A further advantageous embodiment of the invention is characterized in that the threshold value, the interval length and/or the period of time can be set by a user, particularly by means of an EEPROM or a software program.

If the circuit arrangement is used in a car-radio or in the cassette deck of a car-radio, it is for example possible to adapt the threshold value, the interval length and the period of time to the relevant car type by means of the EEPROM prior to mounting of the car-radio or the cassette deck. It is also possible that the user of, for example, the car-radio or the cassette deck has access to a software program by means of a control panel by means of which information can be transferred to the control unit, thereby enabling the user to individually set the threshold value, the interval length and/or the period of time.

A further advantageous embodiment of the invention is characterized in that the control unit is integrated in a microcomputer.

The rectifier element and the integrator element can be realized simply by means of discrete components (diodes and capacitors). The control unit is realized by means of a microcomputer. The output signal of the integrator element is applied to the control input of the microcomputer, where it is converted into a digital signal by means of an A/D converter. Thus, it becomes possible to carry out further functions of the control unit by means of digital signal processing algorithms or by means of a software program. Such a software program is highly flexible and enables the threshold value, the interval length and the period of time to be controlled "on-line" in dependence on the input signal of the control input or these parameters to be set by a user with the aid of an EEPROM or a control panel.

A further advantageous embodiment of the invention is characterized in that the control unit, the rectifier element and the integrator element are integrated as a software program in a microcomputer.

The functions of the rectifier element and the integrator element as well as the control unit can be implemented as a software program in a microcomputer. Such an arrangement is highly flexible but requires an adequate computing capacity.

A further advantageous embodiment of the invention is characterized in that the circuit arrangement is used for the detection of signal pauses on a magnetic tape in a magnetic-tape-cassette apparatus.

The circuit arrangement in accordance with the invention enables a music search system for a magnetic-tape-cassette apparatus to be realized, which locates the next music track in the fast winding mode.

A further advantageous embodiment of the invention is characterized in that the circuit arrangement is used for detecting signal pauses of the signal received in a car-radio with RDS.

Car-radios with RDS (Radio Data System) automatically determine the most powerful reception frequency for a selected station and automatically change the frequency as the location of the car changes. In order to ensure that the user does not notice this frequency change it is advantageous to effect this change in the pauses of the received signal. By means of the circuit arrangement in accordance with the invention such pauses in the received signal can be detected and used for an appropriate frequency change. Since the circuit arrangement in accordance with the invention also enables very short pauses to be detected, it is possible, for example, to use the short pauses between bass tones in music tracks with loud bass tones for a frequency change.

As described hereinbefore, the minimum pause length to be detected can be changed easily. As a result, the circuit arrangement can be used both for the detection of signal pauses of the received RDS signal and for the detection of signal pauses on the magnetic tape of the magnetic-tape-cassette apparatus in an RDS car radio with a cassette deck.

When an RDS signal is applied to the circuit arrangement, the control unit selects a very short minimum pause so as to enable very short pauses to be used for a frequency change. When the signal from the magnetic-tape-cassette apparatus is applied to the circuit arrangement, a longer signal pause is selected so as to detect only the longer pauses between two music tracks rather than the short pauses within a music track.

Preferably, the circuit arrangement in accordance with the invention is used in an audio apparatus, a car radio or in a cassette deck.

BRIEF DESCRIPTION OF THE DRAWINGS

An embodiment of the invention will now be described in more detail with reference to the drawings. In the drawings.

DESCRIPTION OF THE PREFERRED EMBODIMENTS

Figure 1:
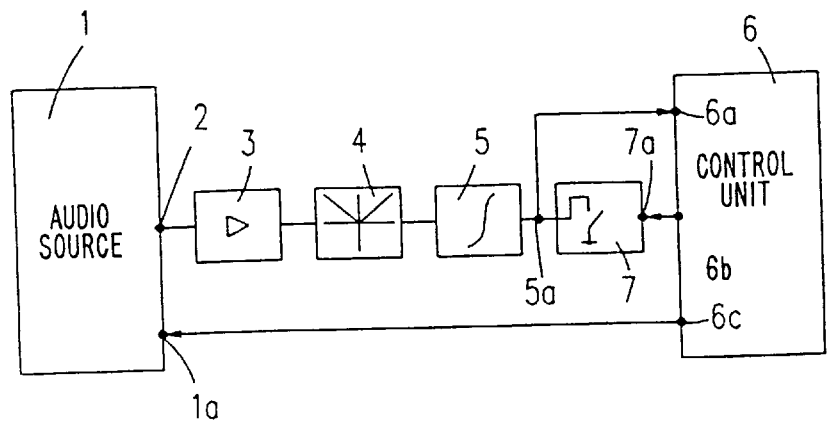
FIG. 1 is a block diagram of the embodiment of the circuit arrangement for the detection of signal pauses in an audio signal, comprising an audio source, an amplifier, a rectifier element, an integrator element, a switching means and a control unit.

FIG. 1 diagrammatically shows a block diagram of a circuit arrangement for the detection of signal pauses in an audio signal. The audio source 1 has a signal output 2 which couples the audio signal into an amplifier 3. The audio source 1 can be, for example, a cassette deck for magnetic-tape cassettes and the audio signal can be music tracks recorded on the magnetic tape and separated from one another by pauses to be detected by means of the circuit arrangement in accordance with the invention. Another conceivable example for the audio source 1 is an RDS (Radio Data System) Tuner of a car radio, the audio signal in this example being the signal received by the tuner. Tuners with an RDS system automatically determine the best receiving frequency for a station selected by a user and automatically change the frequency when the car location changes. In order to ensure that the user does not hear this frequency change, it is desirable to effect this in pauses of the transmitted program. Such a pause detection can also be effected by means of the circuit arrangement in accordance with the invention.

The audio signal supplied by the audio source 1 is amplified in the amplifier 3 and is subsequently applied to a rectifier element 4. If the amplitude of the audio signal supplied by the audio source 1 is large enough, the amplifier 3 can be dispensed with. The audio signal rectified by means of the rectifier element 4 is applied to an integrator element 5, which has an integrator output 5a. The integrator output 5a is coupled to a control input 6a of a control unit 6 and to a switching means 7. The control unit 6 has a first control output 6b, which is coupled to a control input 7a of the switching means 7. If the control unit 6 transfers a control signal or control pulse from the first control output 6b to the control input 7a of the switching means 7, the signal output 5a of the integrator element 5 is coupled to a predetermined signal reference value, for example to ground potential. The control unit 6 has a second control output 6c, which is coupled to a control input 1a of the audio source 1.

The control unit can be realized by means of, for example, a microcomputer. The rectifier element 4, the integrator element 5 and the switching means 7 can be realized by means of discrete components. However, it is also possible to integrate the rectifier element 4, the integrator element 5 and the switching means 7 as a software program in the microcomputer.

Subsequently, an analog-to-digital converter, not shown, converts the analog output signal of the integrator element 5, applied to the control input 6a of the control unit 6, into a digital signal. The control unit 6 performs a control program by means of which the digitized input signal from the control input 6a is processed further. The control program of the control unit 6 compares the digitized input signal from the control input 6a by means of a predetermined threshold value. This threshold value can be stored, for example, in an EEPROM, not shown, to which the control unit 6 has access, or the threshold value can be loaded into the control unit by a user with the aid of an input unit, not shown. Moreover, the control program may automatically control the threshold value in dependence on the amplitude or another parameter of the input signal at the control input 6a. Preferably, a corresponding algorithm in the control program is such that the threshold value is increased as the input amplitude of the input signal at the control input 6a increases. The digitized input signal at the control input 6a can also be used, for example, for driving a bar display in order to display the dynamic characteristics of the audio signal. The control program in the control unit 6 also controls the switching operations of the switching means 7 via the first control output 6b. The control unit 6 transfers a control pulse to the control input 7a of the switching means 7 in intervals of predetermined interval length, as a result of which the switching means 7 couples the integrator output 5a to a fixed reference potential, preferably ground potential. If the audio signal does not exhibit any pauses, the output signal of the integrator element 5 exceeds the threshold value during an interval and the control program in the control unit 6 detects that no pause has occurred in the audio signal. However, if a pause occurs in the audio signal, the output signal of the integrator element 5 does not increase during the next intervals situated within the pause and, consequently, it does not exceed the threshold value. After a predetermined period of time, which defines the minimum pause length, the control program supplies a pulse or a signal to the control input 1a of the audio source 1 via the second control output 6c, thereby indicating to the audio source that the control unit 6 has detected a pause in the audio signal. The control program enables both the interval length, with which the control unit 6 controls the switching means 7, and the period of time after which the control unit 6 detects the signal pauses and transmits this to the audio source 1, to be controlled in dependence on the input signal at the control input. Moreover, it is possible for a user to adjust the interval length and the period, for example by means of an EEPROM to which the control unit 6 has access, or by means of a control panel, not shown, to which the control program transfers the control information.

Figure 2:
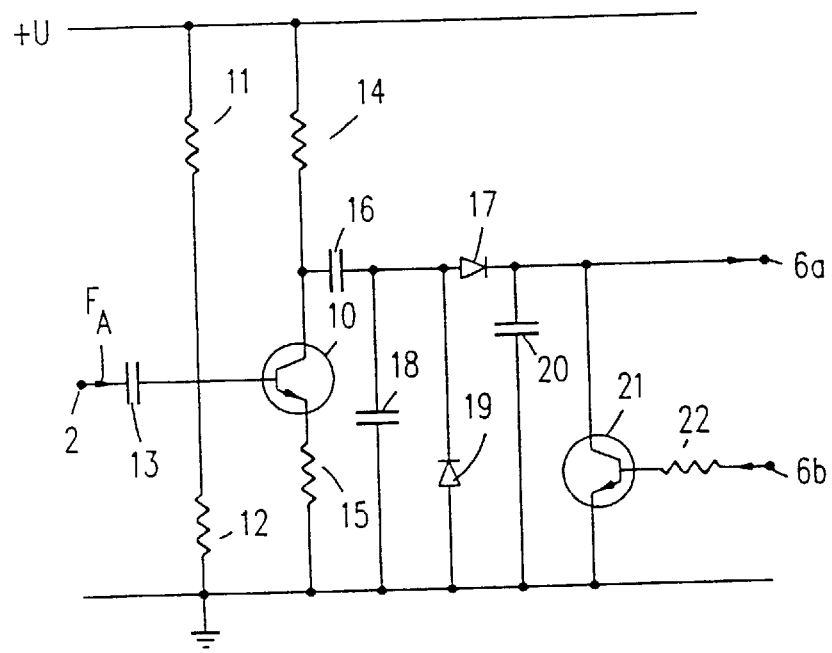
FIG. 2 shows an example of the elements, the amplifier, the rectifier element, the integrator element and the switching means shown in FIG. 1.

FIG. 2 shows a circuit diagram of an example of the amplifier 3, the rectifier element 4, the integrator element 5 and the switching means 7 of FIG. 1.

A transistor 10 has its base coupled to a positive d.c. potential +U via a resistor 11 and to a reference potential via a resistor 12. An audio signal $F_A$ is applied to the base of the transistor 10 via a capacitor 13. The collector of the transistor 10 is coupled to the positive d.c. potential +U via a resistor 14 and the emitter of the transistor 10 is coupled to the reference potential via a resistor 15. The collector of the transistor 10 is coupled in series to the control input 6a of the control unit 6 of FIG. 1 via a capacitor 16 and a diode 17. The node between the capacitor 16 and the diode 17 is coupled to the reference potential via a capacitor 18 and, parallel thereto, also to the reference potential by means of a diode 19. The control input 6a is coupled to the reference potential via a capacitor 20. A transistor 21 has its collector coupled to the control input 6a, its emitter to the reference potential, and its base to the control output 6b of the control unit shown in FIG. 1 via a resistor 22.

The audio signal $F_A$ is applied to the base of the transistor 10, which functions as an amplifier, via the capacitor 13. The amplified output signal is rectified by means of the diodes 17 and 19 and is integrated by means of the capacitor 20. The transistor 21, arranged in parallel with the capacitor 20, functions as a switch, which discharges the capacitor 20 at predetermined instants when the base of the transistor 21 receives a control pulse or control signal from the control input 6b. The rectified signal is applied to the control input 6a. The capacitor 13 as well as the capacitors 16 and 18 give the circuit a band-pass character, in order to minimize the effect of interference such as, for example, noise. If the circuit arrangement is used, for example, for the detection of pauses on a magnetic tape of a magnetic-tape cassette, the capacitor 20 is discharged in the fast forward winding or fast reverse winding mode, for example for a few seconds every 10 ms, via the transistor 21, which is controlled by the control output 6b of the control unit 6. Immediately after this the analog voltage on the control input 6a of the control unit 6 is measured by the analog-to-digital converter, not shown, of the control unit 6. During a signal pause of the analog signal $F_A$ the analog signal across the capacitor 20, after discharging via the transistor 21, remains at a level below the threshold value defined in the control program, as result of which the control unit 6 detects signal pause if this threshold value is not exceeded during the predetermined period of time.

Figure 3:
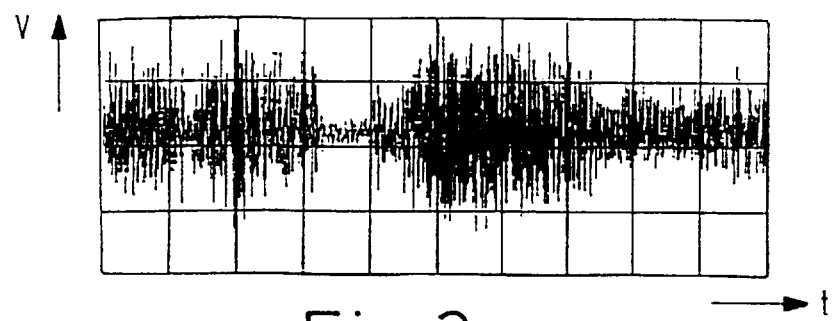
FIG. 3 shows an example of the voltage waveform of an audio signal supplied by the audio source in the period without a pause.

FIG. 3 shows the voltage waveform V of an audio signal without any signal pauses plotted against a time axis t.

Figure 4:
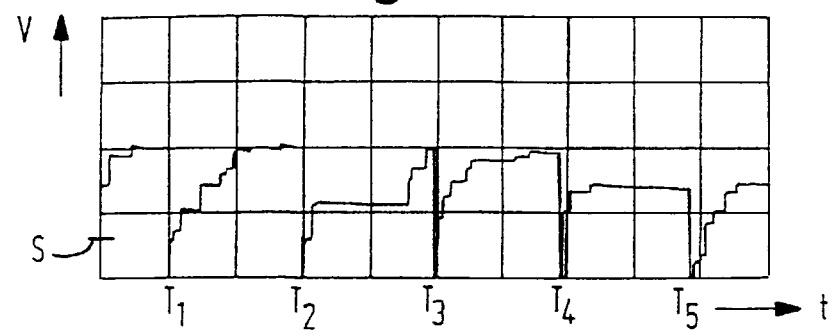
FIG. 4 shows the output voltage signal of the integrator element in the period in which the audio source supplies a signal as shown in FIG. 3.

FIG. 4 shows the voltage waveform V of the input signal at the control input 6a of the control unit 6 plotted against the time axis t when the audio signal shown in FIG. 3 is applied to a circuit arrangement in accordance with the invention as shown in FIGS. 1 and 2.

At the instants $T_1$, $T_2$, $T_3$, $T_4$ and $T_5$ the integrator output 5a coupled to the reference potential and the capacitor 20 is coupled to the reference potential and is thus discharged by means of the transistor 21. Between these individual instants $T_1$, $T_2$, $T_3$, $T_4$ and $T_5$ the audio signal is integrated and the signal on the control input 6a of the control unit 6 increases discontinuously and exceeds the threshold value S in each of the intervals between the individual instants $T_1$, $T_2$, $T_3$, $T_4$ and $T_5$.

Figure 5:
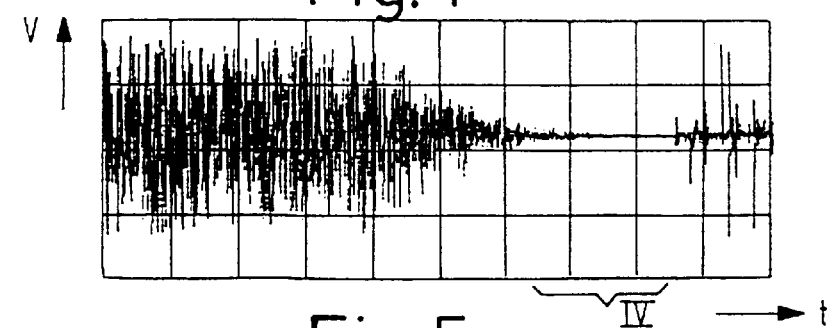
FIG. 5 shows an example of the voltage waveform of the audio signal supplied by the audio source in the period with a pause.

FIG. 5 shows the voltage waveform V of an audio signal having a signal pause in the period IV, plotted against the time axis t.

Figure 6:
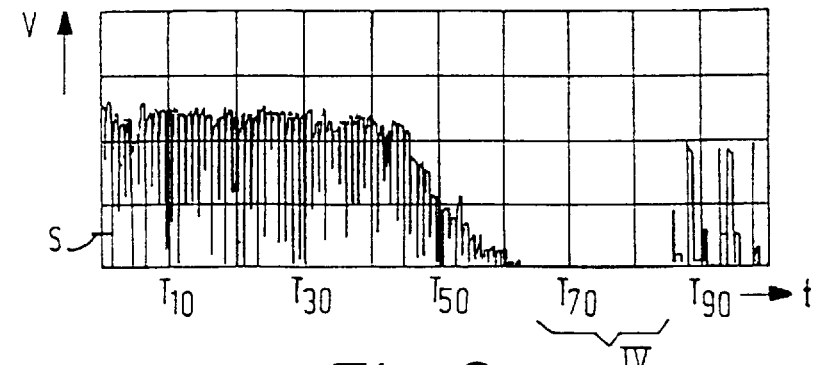
FIG. 6 shows the output voltage signal of the integrator element in the period in which the audio source supplies a signal with a pause as shown in FIG. 5.

FIG. 6 shows the voltage waveform of the input signal at the control input 6a of the control unit 6 plotted against the time axis t, when an audio signal as shown in FIG. 5 is applied to a circuit arrangement in accordance with the invention as shown in FIGS. 1 and 2. The time axis t in FIG. 6 is represented in another way than in FIG. 4. The capacitor 20 discharges to the reference potential via the transistor 21 (FIG. 2) and the output 5a of the integrator element 5 is coupled to reference potential via the switching means 7 (FIG. 1) ten times in each box in FIG. 6, i.e. for example 20 of such discharges occur between the instants $T_{10}$ and $T_{30}$. It is clearly shown that at the location of the pause IV the output signal of the integrator element is substantially constant and the threshold value S is consequently not exceeded during the individual intervals. Depending on the definition of the pause length laid down in the control program, a pause is detected after a given number of intervals in which the threshold value S is not exceeded.

We claim:

1. A circuit arrangement for the detection of signal pauses in an audio signal, comprising:
   a rectifier element, to whose input side the audio signal is applied,
   an integrator element, to which the output signal of the rectifier element is applied, characterized in that there has been provided a control unit, which compares the output signal of the integrator element with a predetermined threshold value,
   the control unit controls switching means in intervals of predetermined interval length,
   when said switching means is actuated by said control unit, said switching means temporarily sets the output signal of the integrator element to a predetermined signal reference value and then said switching means is disconnected from said output signal so that said output signal may resume a steady state value, and
   the control unit detects signal pauses in said audio signal in dependence upon whether the output signal of the integrator element has been smaller than or greater than the threshold value for a predetermined period of time after said switching means has been actuated.

2. A circuit arrangement as claimed in claim 1, characterized in that the control unit sets the threshold value, the interval length and/or the period of time in dependence upon the output signal of the integrator element.

3. A circuit arrangement as claimed in claim 1, characterized in that the threshold value, the interval length and/or the period of time can be set by a user, particularly by means of an EEPROM or a software program.

4. A circuit arrangement as claimed in claim 1, characterized in that the predetermined period of time comprises at least two intervals.

5. A circuit arrangement as claimed in claim 1, characterized in that the control unit is integrated in a microcomputer.

6. A circuit arrangement as claimed in claim 1, characterized in that the control unit, the rectifier element (4; 17, 19) and the integrator element are integrated as a software program in a microcomputer.

7. A circuit arrangement as claimed in claim 1, characterized in that the circuit arrangement is used for the detection of signal pauses on a magnetic tape in a magnetic-tape-cassette apparatus.

8. A circuit arrangement as claimed in claim 1, characterized in that the circuit arrangement is used for detecting signal pauses of the signal received in a car-radio with RDS.

9. An audio apparatus including a circuit arrangement as claimed in claim 1.

10. A cassette deck including a circuit arrangement as claimed in claim 1.

11. A circuit arrangement as claimed in claim 2, characterized in that the predetermined period of time comprises at least two intervals.

12. A circuit arrangement as claimed in claim 3, characterized in that the predetermined period of time comprises at least two intervals.

13. A circuit arrangement as claimed in claim 2, characterized in that the control unit is integrated in a microcomputer.

14. A circuit arrangement as claimed in claim 3, characterized in that the control unit is integrated in a microcomputer.

15. A circuit arrangement as claimed in claim 2, characterized in that the control unit, the rectifier element and the integrator element are integrated as a software program in a microcomputer.

16. A circuit arrangement as claimed in claim 3, characterized in that the control unit, the rectifier element and the integrator element are integrated as a software program in a microcomputer.

17. A circuit arrangement as claimed in claim 16, characterized in that the circuit arrangement is used for the detection of signal pauses on a magnetic tape in a magnetic-tape-cassette apparatus.

18. A circuit arrangement as claimed in claim 14, characterized in that the circuit arrangement is used for detecting signal pauses of the signal received in a car-radio with RDS.

19. An audio apparatus including a circuit arrangement as claimed in claim 5.

20. A cassette deck including a circuit arrangement as claimed in claim 6.

* * * * *